United States Patent
Diaconu et al.

(10) Patent No.: US 10,462,619 B2
(45) Date of Patent: Oct. 29, 2019

(54) PROVIDING A PERSONAL ASSISTANT MODULE WITH A SELECTIVELY-TRAVERSABLE STATE MACHINE

(71) Applicant: Google Inc., Mountain View, CA (US)

(72) Inventors: Adrian Diaconu, Mountain View, CA (US); Jing Qian, Fremont, CA (US); Jack Whyte, London (GB); Ning Ma, Fremont, CA (US); Shir Yehoshua, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 227 days.

(21) Appl. No.: 15/177,327

(22) Filed: Jun. 8, 2016

(65) Prior Publication Data

US 2017/0359707 A1    Dec. 14, 2017

(51) Int. Cl.
*G10L 13/00*    (2006.01)
*G10L 15/26*    (2006.01)
(Continued)

(52) U.S. Cl.
CPC ............... *H04W 4/16* (2013.01); *G06F 9/54* (2013.01); *G10L 13/00* (2013.01); *G10L 15/26* (2013.01);
(Continued)

(58) Field of Classification Search
CPC ....... H04W 88/02; H04W 4/16; H04W 76/10; G06F 9/54; G01L 12/00; G01L 15/26; G01L 15/22
See application file for complete search history.

(56) References Cited

U.S. PATENT DOCUMENTS

| 8,489,398 B1* | 7/2013 | Gruenstein | G10L 15/08 704/231 |
| 8,670,068 B2* | 3/2014 | Hsiung | G03B 11/043 348/371 |

(Continued)

FOREIGN PATENT DOCUMENTS

| WO | 2007047105 | 4/2007 |
| WO | 2011088053 | 7/2011 |

OTHER PUBLICATIONS

International Search Report and Written Opinion of PCT Ser. No. PCT/US16/68927 dated Mar. 14, 2017.
(Continued)

*Primary Examiner* — Marisol Figueroa
(74) *Attorney, Agent, or Firm* — Middleton Reutlinger

(57) ABSTRACT

Techniques are described herein for leveraging an online semantic processor to generate a finite state machine to be delivered to and implemented on a resource-constrained device. In various implementations, a user request may be received by a personal assistant module. Data indicative of the user request may be uploaded, e.g., by the personal assistant module, to an online semantic processor. Data may be received, e.g., by the personal assistant module, from the online semantic processor. The received data may represent a state machine having a plurality of candidate states of the personal assistant module. Each candidate state may be potentially responsive to the request. Resources local to the resource-constrained device may be analyzed to ascertain signal(s) unavailable to the online semantic processor. The personal assistant module may then transition to a given state of the plurality of candidate states. The given state may be selected based on the signal(s).

14 Claims, 5 Drawing Sheets

(51) Int. Cl.
    *H04W 88/02*     (2009.01)
    *G10L 15/22*     (2006.01)
    *H04W 4/16*     (2009.01)
    *H04W 76/10*     (2018.01)
    *G06F 9/54*     (2006.01)

(52) U.S. Cl.
    CPC ............. *H04W 76/10* (2018.02); *G10L 15/22* (2013.01); *H04W 88/02* (2013.01)

(56) References Cited

U.S. PATENT DOCUMENTS

| | | | |
|---|---|---|---|
| 8,805,340 B2* | 8/2014 | Lau | H04W 4/00 455/414.1 |
| 8,892,446 B2 | 11/2014 | Cheyer et al. | |
| 9,026,431 B1* | 5/2015 | Moreno Mengibar | G10L 15/1822 704/10 |
| 9,190,075 B1 | 11/2015 | Cronin | |
| 2006/0206327 A1* | 9/2006 | Hennecke | G10L 15/26 704/251 |
| 2011/0184730 A1* | 7/2011 | LeBeau | G10L 15/30 704/201 |
| 2011/0288868 A1* | 11/2011 | Lloyd | H04M 1/271 704/251 |
| 2012/0035924 A1* | 2/2012 | Jitkoff | G01C 21/3608 704/235 |
| 2013/0278492 A1 | 10/2013 | Stolarz et al. | |
| 2016/0098992 A1* | 4/2016 | Renard | G10L 15/18 704/275 |
| 2017/0256256 A1* | 9/2017 | Wang | G10L 15/1822 |

OTHER PUBLICATIONS

Goyal, Heena, and Shilpa Yaday. "Multi-Agent Distributed Artificial Intelligence." International Journal of Soft Computing and Engineering (IJSCE) 1 (2011). 4 pages.

Venkateshan et al. "Switch State Mechanism for Digital Life Assistant." In 3rd International Conference on Intelligent Computational Systems—ICICS. 2013. 4 pages.

European Patent Office; Written Opinion of the International Preliminary Examining Authority of International Application No. PCT/US2016/068927; 5 pages; dated Apr. 19, 2018.

European Patent Office; International Preliminary Report on Patentability issued in PCT Ser. No. PCT/US2016/068927, dated Sep. 17, 2018; 18 pages.

European Patent Office; Intention to Grant issued in Application No. 16828872.8 dated Mar. 4, 2019.

* cited by examiner

PROVIDING A PERSONAL ASSISTANT MODULE WITH A SELECTIVELY-TRAVERSABLE STATE MACHINE

BACKGROUND

Personal assistant modules currently available on mobile computing devices such as smart phones, tablets, standalone voice command devices, and smart watches typically are implemented in part on the mobile device and in part on online or cloud-based services. This is largely due to the fact that many mobile devices are considered to be resource-constrained in that the memory and/or processing capacity of such devices are constrained based upon technological, economic or other reasons, particularly when compared with the capacities of online or cloud-based services. Consequently, much of the processing power required to interact with a personal assistant module may be on the cloud in the form of an "online semantic processor." However, the online semantic processor may not have easy access to a variety of data points or "signals" that are available on the resource-constrained device. Thus, a request received at the online semantic processor from a resource-constrained device may appear ambiguous, even though one or more signals local to the resource-constrained device may be readily available to resolve the ambiguity with little to no user intervention.

SUMMARY

This specification is directed generally to various techniques for leveraging the virtually limitless resources of the cloud (e.g., in the form of an "online semantic processor") to generate a finite state machine to be delivered to and implemented on a resource-constrained device. In various implementations, the resource-constrained device may implement the state machine based at least in part on one or more signals that are ascertained from resources local to the resource-constrained device.

Therefore, in some implementations, a method may include: receiving, by a personal assistant module operated by a resource-constrained device, a request; uploading, by the personal assistant module, data indicative of the request to an online semantic processor; receiving, by the personal assistant module, from the online semantic processor, data representing a state machine comprising a plurality of candidate states of the personal assistant module, wherein each candidate state is potentially responsive to the request; analyzing, by the personal assistant module, one or more resources local to the resource-constrained device to ascertain one or more signals unavailable to the online semantic processor; and transitioning, by the personal assistant module, to a given state of the plurality of candidate states, wherein the given state is selected based on the one or more signals.

In various implementations, the given state may include an output to be delivered by the personal assistant module. The output may include a solicitation for one or more inputs. In various implementations, the method may further include transitioning, by the personal assistant module, from the given state to another state of the plurality of candidate states based on one or more inputs received by the personal assistant module in response to the solicitation.

In various implementations, the one or more resources local to the resource-constrained device may include a contact list of a user that operates the resource-constrained device. In various implementations, the method may further include disambiguating, by the personal assistant module, between two or more contacts in the contact list based on the one or more inputs. In various implementations, the method may further include disambiguating, by the personal assistant module, between two or more addresses or telephone numbers associated with a single contact in the contact list based on the one or more inputs.

In various implementations, the request may include a request to initiate a telephone call with an individual in the contact list. In various implementations, the request may include a request to send a message to an individual in the contact list. In various implementations, the request may include a request for directions to a location associated with an individual in the contact list.

In various implementations, the one or more resources local to the resource-constrained device may include a plurality of applications installed on the resource-constrained device. The method may further include disambiguating, by the personal assistant module, between two or more of the plurality of applications based on the one or more inputs.

In various implementations, the one or more resources local to the resource-constrained device may include a plurality of media files stored in memory of the resource-constrained device. The method may further include disambiguating, by the personal assistant module, between two or more of the plurality of media files based on the one or more inputs.

In various implementations, the one or more signals may include one or more records of an interaction history between a user and the personal assistant module. In various implementations, the one or more signals may include one or more statistics based on the one or more records of an interaction history between a user and the personal assistant module. In various implementations, the one or more signals may include position coordinates of the resource-constrained device.

In another aspect, a method performable by an online semantic processor may include: receiving, from a personal assistant module operating on a resource-constrained device, data indicative of a user request; generating a state machine comprising a plurality of candidate states of the personal assistant module, wherein each candidate state is potentially responsive to the request depending on one or more signals that are unavailable to the online semantic processor and ascertainable from resources local to the resource-constrained device; and downloading, to the resource-constrained device, data representing the state machine.

In addition, some implementations include an apparatus including memory and one or more processors operable to execute instructions stored in the memory, where the instructions are configured to perform any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
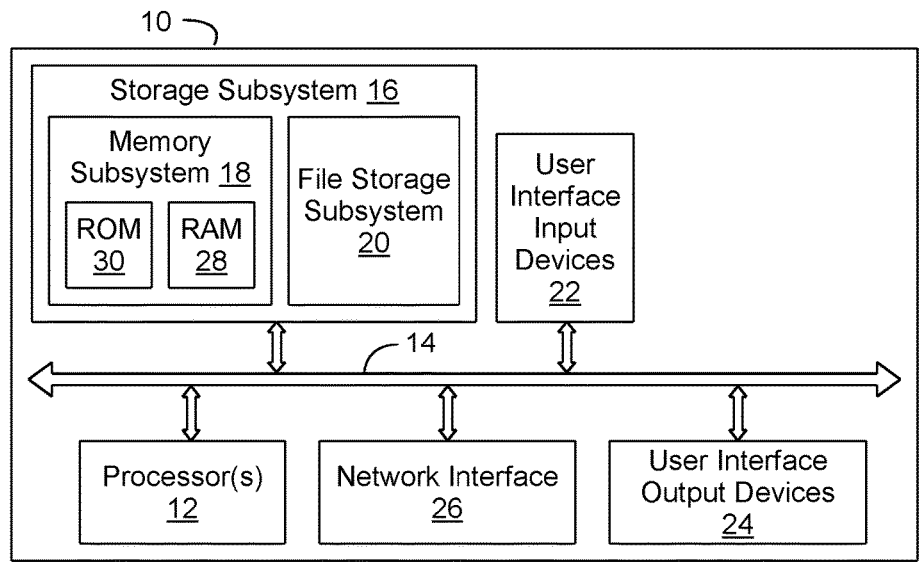
FIG. 1 illustrates an example architecture of a computer system.

In the implementations discussed hereinafter, the virtually limitless resources of the cloud (e.g., in the form of an "online semantic processor") are leveraged to generate a finite state machine to be delivered to and implemented on a resource-constrained device. In various implementations, the resource-constrained device may implement the state machine based at least in part on one or more signals that are ascertained from resources local to the resource-constrained device.

Suppose a user instructs a personal assistant module operating on her smart watch to "call John." An online semantic processor may not have access to the user's smart watch (or other computing devices of a coordinated "ecosystem" of devices associated with the user) to be able to determine if there are any contacts called John on the phone, or if there are multiple numbers for the same contact. To address multiple scenarios, the online semantic processor may generate and provide, to the smart watch, a finite state machine (or simply "state machine"). The state machine may include multiple states, each which may or may not have corresponding output, actions, and/or transitions to other states. In this example, a first state may represent the scenario in which there are multiple contacts named "John" on the user's smart watch, in which case accompanying output may be "Which John did you mean?" A second state may represent the scenario in which there is a single contact "John" with multiple telephone numbers (e.g., work, mobile, etc.), in which case the accompanying output may be "Which phone number?" A third state may represent the scenario in which there is only one contact with only one phone number; the accompanying output may be "Calling John," e.g., displayed in a phone application that has been opened on the user's smart watch. A fourth state of the state machine may represent the scenario in which there is no matching contact in the user's contact list, in which case the accompanying output may be "sorry, there is no contact with that name."

When the user's smart watch receives this state machine, the personal assistant module may poll a variety of resources (e.g., local memory, application data, logs, sensors, etc.) that are local to the smart watch to ascertain one or more signals that may then be used by the personal assistant module to select and transition into an appropriate state. For example, if there are multiple "Johns" in the user's contact list, then the personal assistant module may transition into the first state described above. However, if there is only one "John" in the user's smart watch contact list, the personal assistant module may skip the first state. If there is only single "John" with multiple phone numbers, the personal assistant module may transition directly into the second state. If there are multiple "Johns," and at least one has multiple phone numbers, the personal assistant module may transition into the first state initially, and then from the first state to the second state after receiving disambiguating input from the user.

The "signals" that can be used by the personal assistant module to navigate a state machine received from the online semantic processor are not limited to static data points. In some implementations, the signals may be drawn from historical interaction data between the user and the personal assistant module. That information may be available on the user's mobile phone, e.g., from one or more logs (e.g., a personal assistant log cross referenced with a call log) and/or from statistics generated from various logs. For example, statistics may be available that indicate which contacts a user most often communicates with, which contacts a user most recently communicated with, which applications the user most often or most recently interacted with, what percentage of the total number of times a user consumed a media file that the user consumed a particular type or genre of media file, and so forth. Based on such signals, one or more states may be "skipped" (e.g., traversed automatically) without solicitation of user input.

Further details regarding selected implementations are discussed hereinafter. It will be appreciated however that other implementations are contemplated so the implementations disclosed herein are not exclusive.

Now turning to the drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10. Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors.

Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

Figure 2:
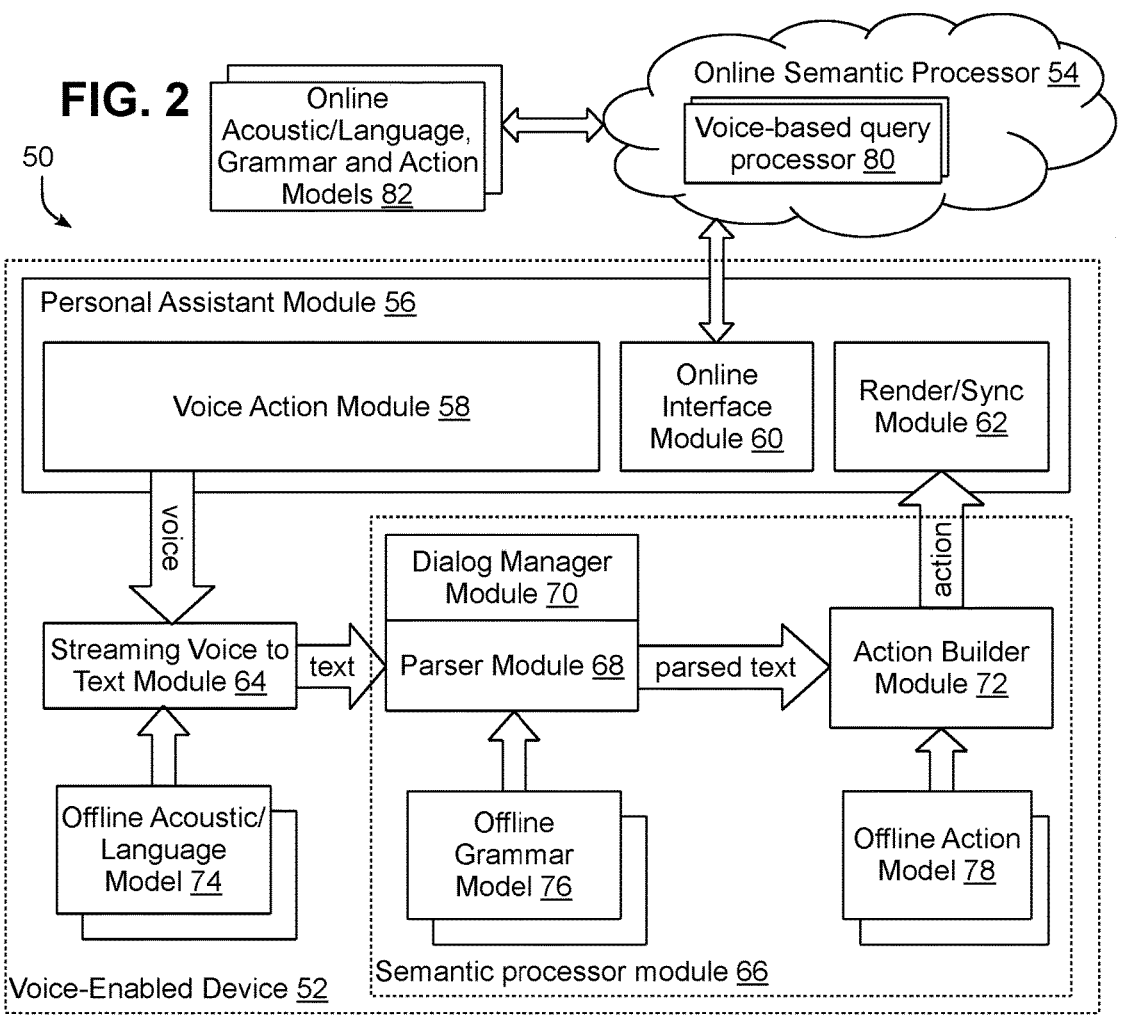
FIG. 2 is a block diagram of an example distributed voice input processing environment.

FIG. 2 illustrates an example distributed voice input processing environment 50, e.g., for use with a voice-enabled device 52 in communication with an online service such as online semantic processor 54. In the implementations discussed hereinafter, for example, voice-enabled device 52 is described as a mobile device such as a cellular phone or tablet computer. Other implementations may utilize a wide variety of other voice-enabled devices, however, so the references hereinafter to mobile devices are merely for the purpose of simplifying the discussion hereinafter. Countless other types of voice-enabled devices may use the herein-described functionality, including, for example, laptop computers, watches, head-mounted devices, virtual or augmented reality devices, other wearable devices, audio/video systems, navigation systems, automotive and other vehicular systems, standalone voice command devices, etc. Moreover, many of such voice-enabled devices may be considered to be resource-constrained in that the memory and/or processing capacities of such devices may be constrained based upon technological, economic or other reasons, particularly when compared with the capacities of online or cloud-based services that can devote virtually unlimited computing resources to individual tasks.

Online semantic processor 54 in some implementations may be implemented as a cloud-based service employing a cloud infrastructure, e.g., using a server farm or cluster of high performance computers running software suitable for handling high volumes of requests from multiple users. Online semantic processor 54 may not be limited to voice-based requests, and may also be capable of handling other types of requests, e.g., text-based requests, image-based requests, etc. In some implementations, online semantic processor 54 may handle voice-based requests such as setting alarms or reminders, managing lists, initiating communications with other users via phone, text, email, etc., or performing other actions that may be initiated via voice input. For the purposes of this disclosure, voice-based requests and other forms of voice input may be collectively referred to as voice-based requests, regardless of whether the voice-based requests seek to initiate a search, pose a question, issue a command, etc. In general, therefore, any voice input, e.g., including one or more words or phrases, may be considered to be a voice-based request within the context of the illustrated implementations.

In the implementation of FIG. 2, voice input received by voice-enabled device 52 is processed by a voice-enabled application (or "app"), which in FIG. 2 takes the form of a personal assistant module 56. In other implementations, voice input may be handled within an operating system or firmware of voice-enabled device 52. Personal assistant module 56 in the illustrated implementation includes a voice action module 58, online interface module 60 and render/synchronization module 62. Voice action module 58 receives voice input directed to personal assistant module 56 and coordinates the analysis of the voice input and performance of one or more actions for a user of the voice-enabled device 52. Online interface module 60 provides an interface with online semantic processor 54, including forwarding voice input to online semantic processor 54 and receiving responses thereto. Render/synchronization module 62 manages the rendering of a response to a user, e.g., via a visual display, spoken audio, or other feedback interface suitable for a particular voice-enabled device. In addition, in some implementations, module 62 also handles synchronization with online semantic processor 54, e.g., whenever a response or action affects data maintained for the user in the online search service (e.g., where voice input requests creation of an appointment that is maintained in a cloud-based calendar).

Personal assistant module 56 may rely on various middleware, framework, operating system and/or firmware modules to handle voice input, including, for example, a streaming voice to text module 64 and a semantic processor module 66 including a parser module 68, dialog manager module 70 and action builder module 72.

Module 64 receives an audio recording of voice input, e.g., in the form of digital audio data, and converts the digital audio data into one or more text words or phrases (also referred to herein as "tokens"). In the illustrated implementation, module 64 is also a streaming module, such that voice input is converted to text on a token-by-token basis and in real time or near-real time, such that tokens may be output from module 64 effectively concurrently with a user's speech, and thus prior to a user enunciating a complete spoken request. Module 64 may rely on one or more locally-stored offline acoustic and/or language models 74, which together model a relationship between an audio signal and phonetic units in a language, along with word sequences in the language. In some implementations, a single model 74 may be used, while in other implementations, multiple models may be supported, e.g., to support multiple languages, multiple speakers, etc.

Whereas module 64 converts speech to text, module 66 attempts to discern the semantics or meaning of the text output by module 64 for the purpose or formulating an appropriate response. Parser module 68, for example, relies on one or more offline grammar models 76 to map text to particular actions and to identify attributes that constrain the performance of such actions, e.g., input variables to such actions. In some implementations, a single model 76 may be used, while in other implementations, multiple models may be supported, e.g., to support different actions or action domains (i.e., collections of related actions such as communication-related actions, search-related actions, audio/visual-related actions, calendar-related actions, device control-related actions, etc.)

As an example, an offline grammar model 76 may support an action such as "set a reminder" having a reminder type parameter that specifies what type of reminder to set, an item parameter that specifies one or more items associated with the reminder, and a time parameter that specifies a time to activate the reminder and remind the user. Parser module 68 may receive a sequence of tokens such as "remind me to," "pick up," "bread," and "after work" and map the sequence of tokens to the action of setting a reminder with the reminder type parameter set to "shopping reminder," the item parameter set to "bread" and the time parameter of "5:00 pm,", such that at 5:00 pm that day the user receives a reminder to "buy bread."

Parser module 68 may also work in conjunction with a dialog manager module 70 that manages a dialog with a user. A dialog, within this context, refers to a set of voice inputs and responses similar to a conversation between two individuals. Module 70 therefore maintains a "state" of a dialog to enable information obtained from a user in a prior voice input to be used when handling subsequent voice inputs. Thus, for example, if a user were to say "remind me to pick up bread," a response could be generated to say "ok, when would you like to be reminded?" so that a subsequent voice input of "after work" would be tied back to the original request to create the reminder. In some implementations, module 70 may be implemented as part of personal assistant module 56.

In various implementations described herein, dialog manager module 70 may receive, e.g., from online semantic processor 54 after online semantic processor 54 receives a request from a user that operates voice-enabled device 52, data representing a state machine comprising a plurality of candidate states of personal assistant module 56. Each candidate state may be potentially responsive to the request from the user. Module 70 may, alone or in conjunction with personal assistant module 56, analyze one or more resources local to voice-enabled device 52 to ascertain one or more signals unavailable to online semantic processor 54. Based on the one or more signals, dialog manager module 70 and/or personal assistant module 56 may then select and transition to a given state of the plurality of candidate states.

Action builder module 72 receives the parsed text from parser module 68, representing a voice input interpretation and generates one or more responsive actions or "tasks" along with any associated parameters for processing by module 62 of personal assistant module 56. Action builder module 72 may rely on one or more offline action models 78 that incorporate various rules for creating actions from parsed text. In some implementations, for example, actions may be defined as functions F such that $F(I_T)=A_U$, where T represents the type of the input interpretation and U represents the type of output action. F may therefore include a plurality of input pairs (T, U) that are mapped to one another, e.g., as $f(i_t)=a_u$, where $i_t$ is an input proto variable of type t, and $a_u$ is an output modular argument or parameter of type u. It will be appreciated that some parameters may be directly received as voice input, while some parameters may be determined in other manners, e.g., based upon a user's location, demographic information, or based upon other information particular to a user. For example, if a user were to say "remind me to pick up bread at the grocery store," a location parameter may not be determinable without additional information such as the user's current location, the user's known route between work and home, the user's regular grocery store, etc.

It will be appreciated that in some implementations, models 74, 76 and 78 may be combined into fewer models or split into additional models, as may be functionality of modules 64, 68, 70 and 72. Moreover, models 74-78 are referred to herein as offline models insofar as the models are stored locally on voice-enabled device 52 and are thus accessible offline, when device 52 is not in communication with online semantic processor 54. Moreover, while module 56 is described herein as being a personal assistant module, that is not meant to be limiting. In various implementations, any type of app operating on voice-enabled device 52 may perform techniques described herein to implement a state machine received from online semantic processor 54.

In various implementations, online semantic processor 54 may include complementary functionality for handling voice input, e.g., using a voice-based query processor 80 that relies on various acoustic/language, grammar and/or action models 82. It will be appreciated that in some implementations, particularly when voice-enabled device 52 is a resource-constrained device, voice-based query processor 80 and models 82 used thereby may implement more complex and computational resource-intensive voice processing functionality than is local to voice-enabled device 52.

In some implementations, multiple voice-based query processors 80 may be employed, each acting as an online counterpart for one or more individual personal assistant modules 56. For example, in some implementations, each device in a user's ecosystem may be configured to operate an instance of a personal assistant module 56 that is associated with the user (e.g., configured with the user's preferences, associated with the same interaction history, etc.). A single, user-centric online instance of voice-based query processor 80 may be accessible to each of these multiple instances of personal assistant module 56, depending on which device the user is operating at the time.

In some implementations, both online and offline functionality may be supported, e.g., such that online functionality is used whenever a device is in communication with an online service, while offline functionality is used when no connectivity exists. In other implementations different actions or action domains may be allocated to online and offline functionality, and while in still other implementations, online functionality may be used only when offline functionality fails to adequately handle a particular voice input. In other implementations, however, no complementary online functionality may be used.

Figure 3:
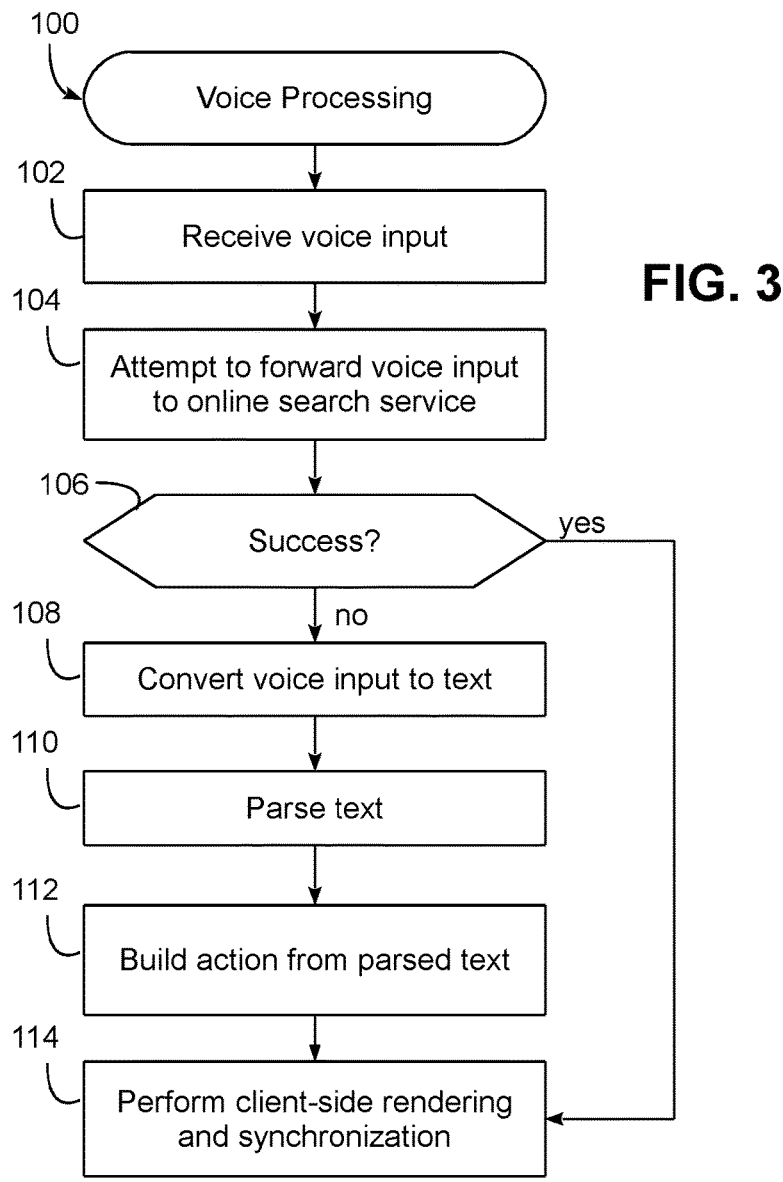
FIG. 3 is a flowchart illustrating an example method of processing a voice input using the environment of FIG. 2.

FIG. 3, for example, illustrates a voice processing routine 100 that may be executed by voice-enabled device 52 to handle a voice input. Routine 100 begins in block 102 by receiving voice input, e.g., in the form of a digital audio signal. In this implementation, an initial attempt is made to forward the voice input to the online search service (block 104). If unsuccessful, e.g., due to a lack of connectivity or a lack of a response from the online search service, block 106 passes control to block 108 to convert the voice input to text tokens (block 108, e.g., using module 64 of FIG. 2), parse the text tokens (block 110, e.g., using module 68 of FIG. 2), and build an action from the parsed text (block 112, e.g., using module 72 of FIG. 2). The resulting action is then used to perform client-side rendering and synchronization (block 114, e.g., using module 62 of FIG. 2), and processing of the voice input is complete.

Returning to block 106, if the attempt to forward the voice input to the online search service is successful, block 106 bypasses blocks 108-112 and passes control directly to block 114 to perform client-side rendering and synchronization. Processing of the voice input is then complete. It will be appreciated that in other implementations, as noted above, offline processing may be attempted prior to online processing, e.g., to avoid unnecessary data communications when a voice input can be handled locally.

Figure 4:
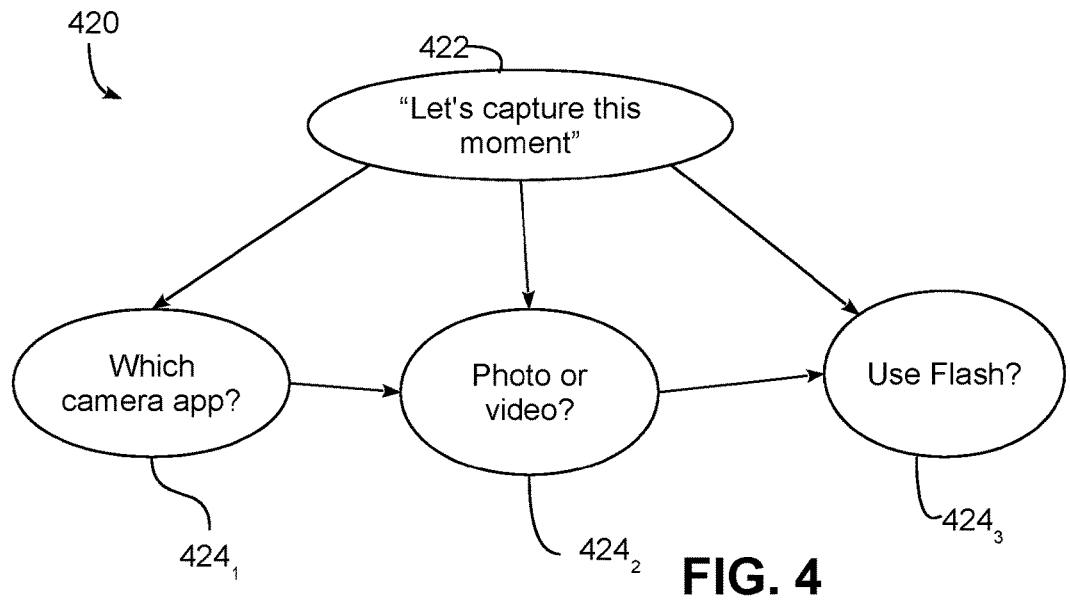
FIG. 4 and FIG. 5 illustrate examples of how disclosed techniques may be implemented in various scenarios, in accordance with various implementations.

FIG. 4 schematically demonstrates an example scenario 420 in which personal assistant module 56 may receive a state machine from online semantic processor 54, e.g., by way of voice-based query processor 80, so that personal assistant module 56 may analyze one or more resources local to voice-enabled device 52 to ascertain one or more signals unavailable to online semantic processor 54 and/or voice-based query processor 80. Based on the analysis, personal assistant module 56 may transition to a given state of the plurality of candidate states that is selected based on the one or more signals.

In this example, the user request 422 includes voice input in the form of the spoken phrase, "Let's capture this moment." In response to the user request 422, a state machine that includes a plurality of candidate states $424_{1-3}$ of the personal assistant module may be generated, e.g., by online semantic processor 54. Each candidate state 424 may be potentially responsive to the query. For example, in a first candidate state $424_1$, personal assistant module 56 may solicit from the user an indication of a particular camera app from a potentially plurality of camera apps that may be installed on voice-enabled device 52. First candidate state $424_1$ may include output (audible or visual) such as "OK, which camera application would you like to use?" In a second candidate state $424_2$, personal assistant module 56 may solicit the user for an indication of whether he or she wishes to capture a photo or video, e.g., by outputting speech such as "Photo or Video?" In a third candidate state $424_3$, personal assistant module 56 may solicit the user to indicate whether he or she wishes to use flash.

As indicated by the arrows, the states 424 of the state machine may lead to other states of the state machine. For instance, after a user responds to the prompt of first candidate state $424_1$, personal assistant module 56 may transition to second candidate state $424_2$ to solicit input indicative of whether the user wishes to take a photo or video, and then to third candidate state $424_3$ to solicit input indicative of whether the user wishes to use flash. However, if the user were required to traverse all three states each time the user issues request 422, the user would likely become frustrated because the process would take too long. Moreover, providing speech output and obtaining responses thereto may consume computing resources such as battery power, processor cycles, and/or memory. Accordingly, in various implementations, personal assistant module 56 may analyze resources local to voice-enabled device 52 to determine whether any states 424 can be skipped without soliciting input from the user.

Suppose upon receiving the state machine of FIG. 4, personal assistant module 56 determines—e.g., from sources such as a registry of installed applications and/or user interaction logs stored locally on voice-enable device 52 (and not readily available to online semantic processor 54)—that the user almost exclusively uses a particular camera app to take photos and videos. Based on that determination, personal assistant module 56 may "skip" first candidate state $424_1$. In some implementations, personal assistant module 56 may notify other components of voice-enabled device 52, such as action builder 72, that the app that should be triggered (e.g., launched from non-volatile memory or made active) in response to request 422 is the particular camera app.

In second candidate state $424_2$, personal assistant module 56 may once again analyze resources local to voice-enabled device 52, such as a use log associated with the selected camera application, to determine whether a prompt for video versus photo is necessary. If the use log does not reveal any clear preference between the two, then personal assistant module 56 may issue the output associated with second candidate state $424_2$ to determine whether the user wishes to shoot a video or a photo. The user's response may be provided, e.g., as a parameter by personal assistant module 56 to action builder 72, so that when the selected camera app is triggered, it is already set to take a photo or video as the user indicated. On the other hand, if the use log does indicate a clear preference by the user to shoot one or the other, then a parameter associated with the preferred format may be provided to action builder 72.

In various implementations, such a preference may be determined in various ways. In some implementations, if the user historically has operated the selected camera app to shoot a photo or video at least a threshold percentage of times of the total uses of the app, then the mode may be automatically selected. In other implementations, personal assistant module 56 may analyze the most recent uses of the selected camera app to determine how the user has been operating the app lately, and may select the mode based on that analysis. For example, if the user is at a birthday party and has been taking a series of videos, even though the user historically usually operates the selected app to take photos, video mode may nevertheless be selected.

After the decision to shoot photo or video is made (whether automatically or in response to user input), personal assistant module 56 may transition to third candidate application $424_3$. In third candidate application $424_3$, personal assistant module 56 may once again analyze resources local to voice-enabled device 52, such as a signal from a light sensor that is configured to detect ambient light in the environment, to determine whether the use of flash is warranted. If the signal from the light sensor indicates a dark environment, then personal assistant module 56 may notify components such as action builder 72 that flash should be enabled when the selected camera app is triggered. If the signal from the light sensor indicates a well-lit environment (e.g., outdoors during the day), then personal assistant module 56 may notify components such as action builder 72 that flash should be disabled when the selected camera app is triggered. If the signal from the light sensor is inconclusive, then personal assistant module 56 may prompt the user, e.g., using speech output, to indicate whether or not flash should be enabled.

Figure 5:
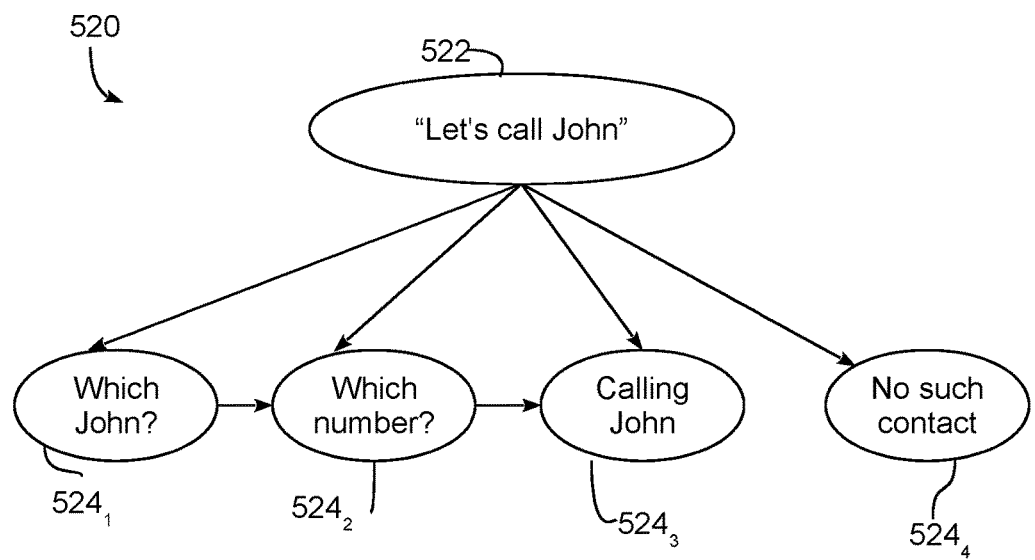

FIG. 5 depicts another example scenario 520 in which personal assistant module 56 may receive and traverse a state machine provided by online semantic processor. In this example, the user request 522 includes the spoken request, "Let's call John." Assuming the user that issued user request 522 has multiple contacts named "John" or "Jon," user request 522 is ambiguous as to which "John" the user is referring to. Accordingly, online semantic processor 54 may identify a plurality of candidate states $524_{1-N}$ that may be traversed by personal assistant module 56 to disambiguate between potentially multiple contacts.

In first candidate state $524_1$, personal assistant module 56 will solicit, from the user, input indicative of which John to call. In second candidate state $524_2$, personal assistant module 56 will solicit, from the user, input indicative of which number (e.g., mobile, home, work) of the selected "John" contact to dial. In third candidate state $524_3$, personal assistant module 56 will initiate a call and provide corresponding output. In fourth candidate state $524_4$, personal assistant module 56 will notify the user that no such contact exists. As indicated by the arrows, in various scenarios, first candidate state $524_1$ may transition to second candidate state $524_2$, which in turn may transition to third candidate state $524_3$.

Upon receipt of the state machine depicted in FIG. 5, personal assistant module 56 may poll resources local to voice-enabled device 52, such as a contact list or social networking friend list, for contacts with the names "John" or "Jon." If a single matching contact is found, personal assistant module 56 may proceed directly to second candidate state $524_2$ if there are multiple phone numbers for the matching contact, and may skip to third candidate state $524_3$ if there is only a single phone number of the matching contact. If multiple matching contacts are found, on the other hand, personal assistant module 56 may either prompt the user (e.g., using speech output) to indicate which John/Jon, or it may poll resources local to voice-enabled device 52 for information signals which it can then use to select a particular contact automatically.

A contact may be automatically selected from a plurality of potential matching contacts—and more generally, an option/input parameter for a given candidate state may be automatically selected from a plurality of options/input parameters—based on a variety of information signals. In some implementations, an option/input parameter may be based at least in part on a history of interaction between a user and one or more computing devices operated by the user, such as the "ecosystem" of devices mentioned previously. A history of interaction between a user and one or more computing devices may include various records of user interactions which may be stored together or separately.

For example, when selecting from multiple matching contacts, personal assistant module 56 may consult resources local to voice-enabled device such as a call log (or more than one call log if there are multiple alternative calling applications), a text message history, an email history (e.g., an inbox and sent mail), and other similar sources, to "guess" which matching contact the user meant. For example, it may be determined, e.g., from call logs, text message history, email history, etc., that when the user who issued user request 522 contacts anyone in a contact list having a name of "John" or "Jon," a particular contact named "John Zenith" has historically been the most popular "John/Jon" targeted by the user, followed by another contact named "John Adams,", and so on. In some implementations, the most popular contact named "John" or "Jon" may be selected automatically. Then, personal assistant module 56 may transition directly to second candidate state $524_2$ if there are multiple phone numbers, and may skip second candidate state $524_2$ without issuing any output and proceed directly to third candidate state $524_3$ if there is only one phone number for the selected contact named "John/Jon."

In some implementations, an option/input parameter for a candidate state may be selected automatically by personal assistant module 56 based at least in part on one or more information signals associated with another task that is deemed sufficiently similar. For example, in determining which of multiple "Johns/Jons" to call, any form of prior contact with a particular contact named "John/Jon," such as a prior phone call using a phone app, a prior text sent using an SMS app, and so forth, may be considered collectively when determining whether to automatically select a particular contact to call. Suppose there are no prior calling activities detected in the user's messaging history, particularly in response to a request to a personal assistant module of "Call John." However, there are records of the user sending text messages to a contacted named "John Jones" in response to prior user requests to the personal assistant module of "text John." The messaging and calling tasks may be deemed sufficiently similar that in response to the "call John" request, personal assistant module 56 may infer that the user wishes to call John Jones.

In addition to or instead of raw popularity, in various implementations, a particular option/input parameter may be selected based at least in part on how the user has behaved recently. Suppose a user has historically picked "John Zenith" more often after issuing a request, "call John," than "John Adams." However, suppose the user has selected "John Adams" more often than "John Zenith" in recent instances (e.g., over the last week). In some implementations, this may be taken into account to select John Adams instead of John Zenith.

The likelihood that particular options/input parameters will be selected automatically by personal assistant module 56 may change over time in response to a variety of signals. In some implementations, a likelihood that a particular option/input parameter will be selected may be based on one or more interactions between the user and one or more voice-enabled devices 52 of an ecosystem following initiation of the selected task. Suppose that while in first candidate state $524_1$, John Adams is selected automatically by personal assistant module 56, and a phone app is initiated with John Adams' phone number pre-dialed. Suppose further that the user presses "talk" to initiate the call. That user interaction may be interpreted as positive feedback which may consequently make it more likely in the future that John Adams will be automatically selected at first candidate state $524_1$. Likewise, if the user rejects instantiation of the phone app with John Adams' number pre-dialed and instead manually dials a new number, that interaction may be interpreted as negative feedback which causes the likelihood that John Adams will be selected automatically in the future to decrease.

Co-operating apps may also impact whether a particular option/input parameter is automatically selected by personal assistant module 56. Suppose a user issues the voice command represented by user request 522 in FIG. 5 to voice-enabled device 52. Suppose further that a SMS app is already open in the background, and that the user had been recently texting with a contact named John Bradley. The fact that the SMS app is already open may, alone or in conjunction with the fact that the user had recently been texting with John Bradley, also increase the likelihood that John Bradley will be automatically selected.

Additionally or alternatively, other information signals associated with options/input parameters may be used to automatically select from those options/input parameters in response to an ambiguous request issued to personal assistant module 56. For example, suppose a user with two contacts named "Sven" issues a request to "call Sven." One Sven contact may normally be favored. However, if personal assistant module 56 polls resources local to voice-enabled device 52 (e.g., a calendar, emails, text messages, etc.) to determine that the user has a meeting scheduled with the other Sven in the near future, the likelihood that the other Sven's may be selected may be at least temporarily elevated leading up to, during, and perhaps for some time after the meeting. Similarly, if resources local to voice-enabled device 52 reveal that one Sven has an upcoming birthday, or is scheduled to arrive in town on a particular flight, the likelihood that the one Sven will be selected automatically over the other may increase, at least temporarily.

In some implementations, a likelihood that a particular option/input parameter will be selected by personal assistant module 56 (e.g., at first candidate state $524_1$) may be based on a measure of similarity between the user's current context and a context of the user when the user performed the same or similar task in the past. Suppose the user typically calls co-worker David Smith during the week and sibling David Jones on the weekends. If the user issues the request "call Dave" during the week, the user's context may be more similar to previous instances in which the user called David Smith, thereby increasing the likelihood that David Smith will be selected. Likewise, if the user issues the request during the weekend, the user's context may be more similar to previous instances in which the user called David Jones. This may increase the likelihood that David Jones will be selected at first candidate state $524_1$.

More complex contextual comparisons may be performed as well to select contacts. In some implementations, features may be extracted from previous and current contexts and compared to determine measures of similarity. Various techniques may be employed to calculate measures of similarity between contexts, including but not limited to Kullback-Leibler ("KL") divergence, cosine similarity, Levenshtein distances, etc. For example, upon issuing a request such as 522, a feature vector corresponding to the user's current context may be compared to feature vectors generated for the user's context during prior implementation of a state machine similar to that in FIG. 5 by the user's personal assistant module 56. The past feature vector that is most similar to the feature vector representing the user's current context may be deemed to have the highest chance of being responsive, and may therefore be used to select from multiple contacts. The past feature vector that is least similar to the feature vector representing the user's current context may be deemed to have the lowest chance of being responsive. Consequently, the contact called by the user in the prior context may be least likely to be automatically selected at first candidate state $524_1$.

The above examples describe automatic selection by personal assistant module 56 from multiple contacts at first candidate state $524_1$. However, this is not meant to be limiting. Personal assistant module 56 may employ similar techniques at a variety of candidate states to select from multiple options and/or input parameters. For example, similar techniques may be employed at second candidate state $524_2$ by personal assistant module 56 to select which phone number of a particular contact named "John/Jon" to call.

Figure 6:
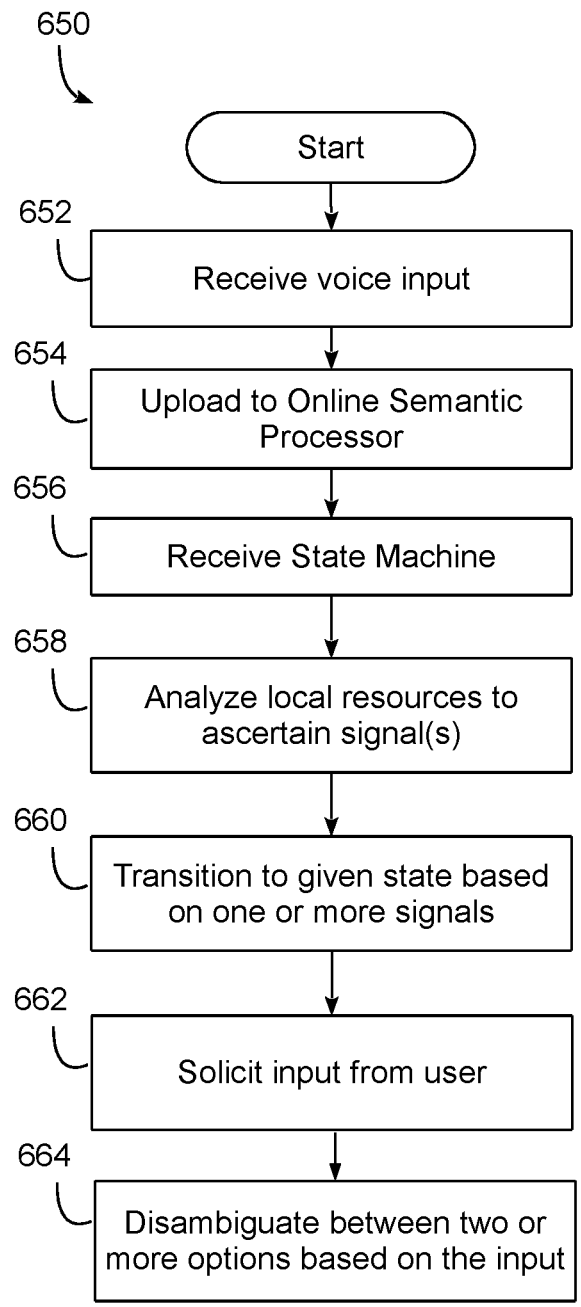
FIG. 6 is a flowchart illustrating an example method performable by a personal assistant module, in accordance with various implementations.

FIG. 6 illustrates a routine 650 suitable for execution by a personal assistant module 56 to provide a user request to an online semantic processor 54, e.g., by way of voice-based query processor 80, and to receive and implement, in response, a finite state machine. Routine 650 may be executed by the same service that processes voice-based queries, or may be a different service altogether.

At block 652, voice input is received, e.g., in the form of a digital audio signal. At block 654, the user request may be uploaded to online semantic processor 54. In some implementations, the voice input may be converted to text tokens (e.g., using module 64 and/or model 82 of FIG. 2) prior to upload. In other implementations, the audio data may be uploaded directly to online semantic processor 54, which may convert the voice input to text tokens itself.

At block 656, personal assistant module 56 may receive, e.g., directly or indirectly from online semantic processor 54, a state machine. At block 658, personal assistant module 56 may analyze (e.g., poll) resources local to voice-enabled device 52 to ascertain one or more information signals. For example, and as was described above, personal assistant module 56 may obtain information signals from various local resources, including but not limited to contact lists, call logs, text messaging logs, installed application registries, calendars, emails, social networking logs, sensors such as position coordinate sensors (e.g., GPS, cellular triangulation), light sensors, and/or accelerometers, tasks lists, application logs, and so forth.

At block 660, personal assistant module 56 may transition to a given state based on one or more of the signals ascertained at block 658. For example, and as described above, personal assistant module 56 may transition directly to second candidate state $424_2$ from user request 422 (essentially skipping first candidate state $424_1$) if it is determined from polling resources local to voice-enabled device 52 that only a single camera application is installed.

Depending on the transitioned-to state and locally-available information signals, in some implementations at block 662, personal assistant module 56 may solicit input from the user, e.g., by rendering computer-generated speech. For example, in second candidate state $424_2$, personal assistant module 56 may output speech such as "Do you want to shoot a photograph or video?" In some implementations, the input solicited at block 662 may be used by personal assistant module at block 664 to disambiguate between two or more options/input parameters (e.g., contacts, two or more installed apps, app settings, addresses, telephone numbers, media files, etc.). On the other hand, if, in the state transitioned into at block 660, personal assistant module 56 is not to solicit output (e.g., $524_3$ or $524_4$ in FIG. 5), then personal assistant module 56 may simply initiate the action (calling, texting, setting a task reminder, create calendar entry, etc.) associated with the transitioned-to state.

While implementations described herein have primarily demonstrated invocation of telephone and camera apps, this is not meant to be limiting. Techniques described herein may be used to invoke a variety of other types of apps, or more generally to initiate other types of responsive tasks. For example, when a user issues a request "set an alarm for me at XX," the information signals obtained from resources local to one or more voice-enabled devices 52 of her ecosystem may be analyzed to determine her habits vis-à-vis alarm setting. Based on those habits and various other information signals such as the date, time and location, a state machine received by personal assistant module 56 from online semantic processor 54 may be at least partially navigated without soliciting user input.

Another example demonstrates how disclosed techniques may be used to consume media files. Suppose a user issues a request, "I sure could go for some music from Artist A." A state machine returned by online semantic processor 54 in response to such a request may include states for soliciting the user to select a music playing app (e.g., play locally-stored music versus streaming), states for soliciting the user to select a particular album or song, states for soliciting the user to select parameters such as "play random," "volume," etc., and so forth. Personal assistant module 56 may poll various resources local to the resource-constrained device to determine the user's listening habits, preferences, locally stored matching songs, etc., to automatically navigate through at least part of a state machine generated and provided by online semantic processor 54. In addition to these examples, disclosed techniques may also be used in response to other user requests, such as requests to send a text/email messages, requests for directions to a location, e.g., associated with an individual in a contact list, requests for reservations (e.g., airlines, restaurants, hotels, rental cars, etc.), and so forth.

Figure 7:
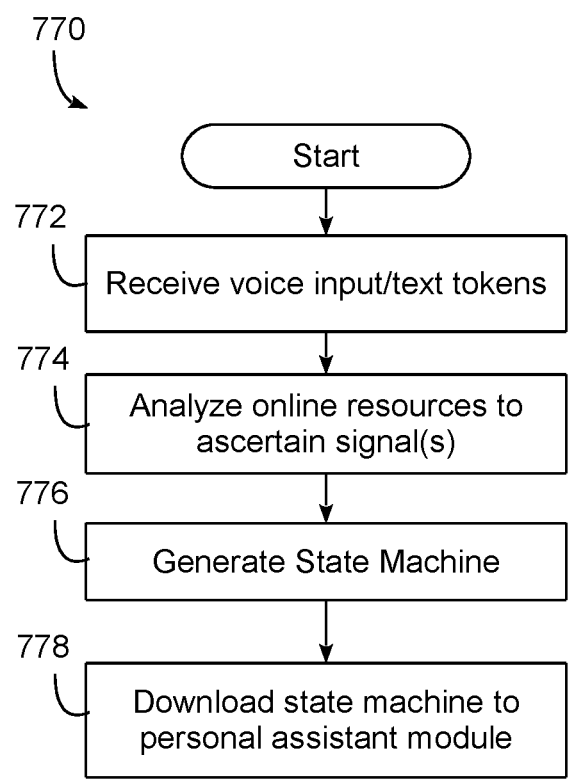
FIG. 7 is a flowchart illustrating an example method performable by online semantic processor, in accordance with various implementations.

FIG. 7 illustrates a routine 770 suitable for execution by online semantic processor 54 (and/or voice-based query processor 80) to generate and provide personal assistant module 56 with a finite state machine based on a user request. At block 772, online semantic processor may receive data indicative of a user request, such as voice input and/or text tokens that were already parsed, e.g., by parser module 68.

At block 774, online semantic processor 54 may analyze various online resources to ascertain various information signals about the user associated with personal assistant module 56 in particular, and/or about users generally. With regard to a particular user, the online resources may include but are not limited to social network profiles, emails (assuming the user has permitted such access), the user's search history (again, assuming the user has permitted such access), applications to which the user has rights (e.g., as may be ascertained from an "App Store" at which the user has an account), and so forth. With regard to users generally, the online resources may include but are not limited to aggregate user search history, aggregate user activity logs (which may maintain anonymity of individual users), and so forth.

At block 776, online semantic processor 54 may generate, based on the user request received at block 772 and the signals it ascertained at block 774, a state machine that is traversable by personal assistant module 56. As described above, one or more states of the state machine may include associated outputs which may be rendered to a user over various output modalities, such as speech, text, graphics, etc. One or more states of the state machine may also be associated with responsive actions, such as placing phone call, sending a text message, sending an email, setting a reminder, creating and/or at least partially populating a calendar entry, opening a media playing app to output a particular media file, launching a media streaming service, making a reservation, opening one app versus another, and so forth.

In some implementations, online semantic processor 54 may use one or more information signals ascertained at block 774 to generate the state machine initially, e.g., so that a first, "default" state in response to such a request is the response deemed most likely to be responsive to the user's request. But other states of the state machine may represent alternative options that, in some instances, may override the default known to the online semantic processor depending on one or more information signals polled from resources local to voice-enabled device 52 (e.g., see block 658 of FIG. 6).

For example, online semantic processor 54 may determine from online call logs or other information that calling John Smith at home is the most likely response to a user request of "Call John. Accordingly, online semantic processor 54 may generate a state machine with a default state associated with calling John Smith at home. However, other signals on the user's mobile device may suggest that in some scenarios, another telephone number may actually be desired in response to the same request. Suppose the default John Smith is located in the Central Time Zone that is typically shared by the user, but that the user has travelled to a faraway time zone. Suppose further that there is a second, less-often utilized contact named "John Jones" in the user's contact list. Suppose further that "John Jones" is located in the faraway time zone. Based at least on a signal from a position coordinate component (e.g., GPS, cell tower identity or triangulation) on voice-enabled device 52, it may be determined that while normally the user would intend to call John Smith, under these particular circumstances, the user may actually intend to call John Jones. To account for such possibilities, online semantic processor 54 may include in the state machine an alternative "fall back" or "catch all" state (e.g., "Which John did you mean?") for personal assistant module 56 to transition to in case the default state is overridden by information signals obtained from resources local to voice-enabled device 52.

Back at FIG. 7, at block 778, online semantic processor 54 may download data indicative of the state machine generated at block 776 to personal assistant module 56. This data may come in various forms that may be executable and/or interpretable by personal assistant module 56. In some implementations, the data indicative of a state machine may be in the form of a markup language such as the eXtensible Markup Language ("XML") that may be interpreted by personal assistant module 56. In some implementations, the data indicative of the state machine may be in the form of a modeling language such as the Unified Modeling Language ("UML") that may be interpreted by personal assistant module 56. In some implementations, the state machine may come in the form of a graph, e.g., with nodes that represent states (and corresponding output/responsive actions) and edges that represent transitions between states. In some implementations, the state machine may come in the form of bytecode, script, or other computer-executable instructions in various stages of compilation that may be interpreted and/or executed by personal assistant module 56.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. An online semantic processor, comprising:
a communication interface;
one or more processors operably coupled with the communication interface; and
memory operably coupled with the one or more processors, the memory storing instructions that, when executed by the one or more processors, cause the one or more processors to:
receive, from a personal assistant module operating on a resource-constrained device, via the communication interface, data indicative of a user request;
generate a state machine comprising a plurality of candidate states that are traversable by the personal assistant module at the resource-constrained device based on one or more signals that are unavailable to the online semantic processor and ascertainable by the personal assistant module from one or more sensors local to the resource-constrained device,
wherein at least a first candidate state of the plurality of candidate states comprises an output to be delivered by the personal assistant module that solicits input selecting between two or more distinct software application states that are potentially responsive to the user request, and
wherein at least a second candidate state of the plurality of candidate states is reachable by the personal assistant module by transitioning past the first candidate state based on one or more of the signals that are unavailable to the online semantic processor, and wherein in the second candidate state at least one of the two or more distinct software application states has been selected automatically based on the one or more of the signals; and
download, to the resource-constrained device, via the communication interface, data representing the state machine.

2. The online semantic processor of claim 1, further comprising instructions to analyze one or more online resources associated with the user to ascertain one or more information signals, wherein the state machine is generated based at least in part on the one or more information signals.

3. At least one non-transitory computer-readable medium comprising instructions that, in response to execution of the instructions by a resource-constrained device, cause the resource constrained device to operate a personal assistant module that performs the following operations:
receiving a user request;
uploading data indicative of the user request to an online semantic processor;
receiving, from the online semantic processor, data representing a state machine comprising a plurality of candidate states of the personal assistant module, wherein at least a first candidate state of the plurality of candidate states comprises an output to be delivered by the personal assistant module that solicits input selecting between two or more software application settings for a given software application installed on the resource-constrained device that is potentially responsive to the request;
analyzing one or more resources local to the resource-constrained device to ascertain one or more signals unavailable to the online semantic processor, wherein the one or more resources include information, stored locally on the resource-constrained device, about use of the given software application installed on the resource-constrained device; and
transitioning, at the resource-constrained device without receiving disambiguating input from a user of the resource-constrained-device, past the first candidate state of the plurality of candidate states to a second state of the plurality of candidate states in which at least one of the two or more software application settings has been selected, wherein the transitioning is based on the one or more signals unavailable to the online semantic processor.

4. The at least one non-transitory computer-readable medium of claim 3, wherein the given software application is configured to operate a camera integral with the resource-constrained device, and the output to be delivered by the personal assistant module includes a request for the user to provide a camera flash setting.

5. The at least one non-transitory computer-readable medium of claim 3, wherein the given software application is configured to operate a camera integral with the resource-constrained device, and the output to be delivered by the personal assistant module includes a request for the user to select between photo and video.

6. The at least one non-transitory computer-readable medium of claim 3, wherein the given software application comprises a media playing application.

7. The at least one non-transitory computer-readable medium of claim 6, wherein the output to be delivered by the personal assistant module includes a request for the user to select between random playback and another playback mode.

8. The at least one non-transitory computer-readable medium of claim 6, wherein the output to be delivered by the personal assistant module includes a request for the user to select a volume level.

9. A method implemented using one or more processors, comprising:
receiving a user request;

uploading data indicative of the user request to an online semantic processor;

receiving, from the online semantic processor, data representing a state machine comprising a plurality of candidate states of the personal assistant module, wherein at least a first candidate state of the plurality of candidate states comprises an output to be delivered by the personal assistant module that solicits input selecting between two or more software application settings for a given software application installed on the resource-constrained device that is potentially responsive to the request;

analyzing one or more resources local to the resource-constrained device to ascertain one or more signals unavailable to the online semantic processor, wherein the one or more resources include information, stored locally on the resource-constrained device, about use of the given software application installed on the resource-constrained device; and transitioning, at the resource-constrained device without receiving disambiguating input from a user of the resource-constrained-device, past the first candidate state of the plurality of candidate states to a second state of the plurality of candidate states in which at least one of the two or more software application settings has been selected, wherein the transitioning is based on the one or more signals unavailable to the online semantic processor.

10. The method of claim 9, wherein the given software application is configured to operate a camera integral with the resource-constrained device, and the output to be delivered by the personal assistant module includes a request for the user to provide a camera flash setting.

11. The method of claim 9, wherein the given software application is configured to operate a camera integral with the resource-constrained device, and the output to be delivered by the personal assistant module includes a request for the user to select between photo and video.

12. The method of claim 9, wherein the given software application comprises a media playing application.

13. The method of claim 12, wherein the output to be delivered by the personal assistant module includes a request for the user to select between random playback and another playback mode.

14. The method of claim 12, wherein the output to be delivered by the personal assistant module includes a request for the user to select a volume level.

* * * * *